United States Patent
Huang et al.

(10) Patent No.: US 9,804,360 B2
(45) Date of Patent: Oct. 31, 2017

(54) LENS ASSEMBLY

(71) Applicant: ZHEJIANG SUNNY OPTICS CO., LTD., Ningbo, Zhejiang (CN)

(72) Inventors: Lin Huang, Zhejiang (CN); Fujian Dai, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 106 days.

(21) Appl. No.: 14/777,262

(22) PCT Filed: Mar. 3, 2015

(86) PCT No.: PCT/CN2015/073581
§ 371 (c)(1),
(2) Date: Sep. 15, 2015

(87) PCT Pub. No.: WO2016/058313
PCT Pub. Date: Apr. 21, 2016

(65) Prior Publication Data
US 2016/0109685 A1    Apr. 21, 2016

(30) Foreign Application Priority Data

Oct. 17, 2014 (CN) ............................ 2014 1 0554378
Oct. 17, 2014 (CN) ...................... 2014 2 0602144 U

(51) Int. Cl.
*G02B 13/18* (2006.01)
*G02B 13/00* (2006.01)
(Continued)

(52) U.S. Cl.
CPC ........... *G02B 13/0035* (2013.01); *G02B 9/16* (2013.01); *G02B 27/0025* (2013.01)

(58) Field of Classification Search
CPC ...... G02B 13/0035; G02B 13/18; G02B 9/62; G02B 13/04; G02B 9/14; G02B 9/16
(Continued)

(56) References Cited

U.S. PATENT DOCUMENTS 7,035,024 B2    4/2006 Nagai et al.
7,196,855 B2    3/2007 Yamaguchi
(Continued)

FOREIGN PATENT DOCUMENTS

CN    1447144 A    10/2003
CN    2731485 Y    10/2005
(Continued)

OTHER PUBLICATIONS

English translation of the First Office Action of the State Intellectual Property Office of People's Republic of China, dated Mar. 31, 2016, for corresponding Chinese Application No. 201410554378.6.
(Continued)

*Primary Examiner* — Scott J Sugarman
(74) *Attorney, Agent, or Firm* — David D. Brush; Westman, Champlin & Koehler, P.A.

(57) ABSTRACT

A lens assembly includes a first lens, a second lens and a third lens from an object side of the lens assembly to an image side of the lens assembly, in turn. The first lens has a positive refractive power and object side with a convexity; the second lens has a negative refractive power; and the third lens has a positive refractive power. The lens assembly has characteristics such as broad filed angle (wide angle), miniaturization and high imaging quality.

9 Claims, 18 Drawing Sheets

(51) Int. Cl.
   *G02B 9/16*      (2006.01)
   *G02B 27/00*     (2006.01)

(58) Field of Classification Search
   USPC .................................................. 359/716, 785
   See application file for complete search history.

(56) References Cited

U.S. PATENT DOCUMENTS

| | | | |
|---|---|---|---|
| 7,342,729 B2 | 3/2008 | Sato et al. | |
| 7,423,817 B2 | 9/2008 | Nakanishi | |
| 7,423,820 B2 | 9/2008 | Taniyama | |
| 7,529,041 B2 | 5/2009 | Huang et al. | |
| 7,564,635 B1* | 7/2009 | Tang | G02B 9/12 359/716 |
| 7,660,050 B2 | 2/2010 | Sato et al. | |
| 7,675,692 B2 | 3/2010 | Do | |
| 7,738,191 B2 | 6/2010 | Sato | |
| 7,898,747 B2 | 3/2011 | Tang | |
| 8,184,384 B2* | 5/2012 | Asami | G02B 13/004 359/715 |
| 8,331,043 B2* | 12/2012 | Li | G02B 9/12 359/753 |
| 8,462,449 B2 | 6/2013 | Hsu et al. | |
| 8,570,667 B2 | 10/2013 | Hsu et al. | |
| 2009/0284846 A1 | 11/2009 | Teraoka et al. | |
| 2010/0157443 A1 | 6/2010 | Goto et al. | |
| 2010/0259632 A1* | 10/2010 | Matsusaka | G02B 13/004 348/222.1 |

FOREIGN PATENT DOCUMENTS

| | | |
|---|---|---|
| CN | 1690733 A | 11/2005 |
| CN | 1945372 A | 4/2007 |
| CN | 101038413 A | 9/2007 |
| CN | 101046543 A | 10/2007 |
| CN | 101073027 A | 11/2007 |
| CN | 101276038 A | 10/2008 |
| CN | 201993515 U | 9/2011 |
| CN | 202102169 U | 1/2012 |
| CN | 102621670 A | 8/2012 |
| CN | 204314535 U | 5/2015 |
| JP | 2005173319 A | 6/2005 |
| JP | 2005345919 A | 12/2005 |
| JP | 2007094115 A | 4/2007 |
| TW | 200829975 A | 7/2008 |
| TW | 200907457 A | 2/2009 |

OTHER PUBLICATIONS

English translation of the International Search Report and Written Opinion dated Mar. 3, 2015 for corresponding International Application No. PCT/CN2015/073581, filed Mar. 3, 2015.

English translation of the Notification of Reasons for Refusal of JP Application No. 2016-553700 dated Oct. 28, 2016.

English translation of the Second Office Action of the State Intellectual Property Office of People's Republic of China, dated Jul. 15, 2016, for corresponding Chinese Application No. 201410554378.6.

* cited by examiner

LENS ASSEMBLY

CROSS-REFERENCE TO RELATED APPLICATION

This Application is a Section 371 U.S. National Stage Application of International Application No. PCT/CN2015/073581 filed on Mar. 3, 2015, which claims priorities and benefits of Chinese Patent Applications No. 201410554378.6 and No. 201420602144.X, both filed with the State Intellectual Property Office of P. R. China on Oct. 17, 2014, the entire contents of which are incorporated herein by reference.

FIELD

The present disclosure relates to a camera technology, in particularly to a lens assembly.

BACKGROUND

With the improvements in properties of charge-coupled device (CCD) and complementary metal-oxide semiconductor (CMOS) image sensors, as well as the reduction in size, it requires the corresponding lens assembly to meet demands on high imaging quality and miniaturization.

Although a triplet lens assembly in the related art has been developing relatively mature, it still exist many restrictions. For example, miniaturization leads to a relative narrow filed angle, which may be enlarged by changing a diopter of a lens in the lens assembly at the expense of worsen aberration, thereby results in degradation in the imaging quality.

SUMMARY

The present disclosure aims to solve at least one of the technical problems existing in the related art. Therefore, the present disclosure provides in embodiments a lens assembly.

The lens assembly according to embodiments of the present disclosure includes a first lens, a second lens and a third lens from an object side of the lens assembly to an image side of the lens assembly in turn, wherein the first lens is of a positive refractive power, an object side of the first lens is of a convexity; the second lens is of a negative refractive power; and the third lens is of a positive refractive power. The lens assembly meets the following formulas: tan(HFOV)>0.74; TTL/ImgH<1.7; 0.6<f1/f<0.8 and −1.3<f1/f2<−0.8, wherein HFOV represents half of a field angle of the lens assembly, TTL represents a total track length of the lens assembly, ImgH represents half diameter of an effective pixel region of the lens assembly at an imaging plane, f1 represents a focal length of the first lens, f2 represents a focal length of the second lens, and f represents an effective focal length of the lens assembly.

The lens assembly according to embodiments of the present disclosure meeting the above formulas has characteristics such as broad field angle (wide angle), miniaturization and high imaging quality.

In some embodiments, the lens assembly further meets the following formulas: |(R1+R2)/(R1−R2)|<0.4 and −1.5<R2/f<−0.5, wherein R1 represents a curvature radius of the object side of the first lens, and R2 represents a curvature radius of an image side of the first lens.

In some embodiments, the lens assembly further meets the following formulas: −8<(R5+R6)/(R5−R6)<−4 and 0.8<f3/f<1.6, wherein R5 represents a curvature radius of an object side of the third lens, R6 represents a curvature radius of an image side of the third lens, and f3 represents a focal length of the third lens.

In some embodiments, the lens assembly further meets the following formulas: 1.4<CT1/CT2<1.9 and 1.8<CT3/CT2<2.0, wherein CT1 represents a center thickness of the first lens, CT2 represents a center thickness of the second lens, and CT3 represents a center thickness of the third lens.

In some embodiments, the lens assembly further meets the following formula: 0.4<(CT1+CT2+CT3)/TTL<0.6.

In some embodiments, an image side of the first lens is of a convexity. An object side of the second lens is of a concavity, and an image side of the second lens is of a convexity. An object side of the third lens is of a convexity and has one inflection point, and an image side of the third lens is of a concavity and has one inflection point.

In some embodiments, the lens assembly further includes a diaphragm arranged between an object being imaged and the second lens.

In some embodiments, each of the first lens, the second lens and the third lens is made of a plastic material.

In some embodiments, the image side of the second lens has one inflection point.

Additional aspects and advantages of present disclosure will be given in part in the following descriptions, become apparent in part from the following descriptions, or be learned from the practice of the present disclosure.

BRIEF DESCRIPTION OF THE DRAWINGS

Above mentioned and/or additional aspects and advantages of the present disclosure will become apparent and more readily appreciated from the following descriptions of embodiments made with reference to the accompanying drawings, in which.

DETAILED DESCRIPTION

Figure 1:
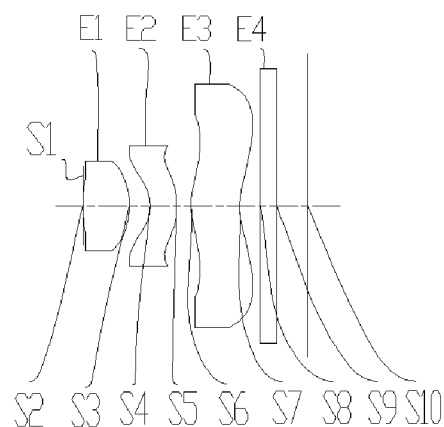
FIG. 1 is a schematic view showing the lens assembly according to Example 1 of the present disclosure.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the description of the present disclosure, it shall be appreciated that, terms "first", "second" are just used herein for purposes of description and are not intended to indicate or imply relative importance or significance or to imply the number of indicated technical features. Thus, the feature defined with "first" and "second" may explicitly or implicitly comprise one or more this feature. In the description of the present disclosure, "a plurality of" means two or more than two, unless specified otherwise.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

Referring to FIG. 1, the lens assembly according to embodiments of the present disclosure includes a first lens E1, a second lens E2 and a third lens E3 from an object side of the lens assembly to an image side of the lens assembly in turn, wherein the first lens E1 is of a positive refractive power, an object side S1 of the first lens is of a convexity; the second lens E2 is of a negative refractive power; and the third lens E3 is of a positive refractive power.

The lens assembly meets the following formulas:

$\tan(\text{HFOV}) > 0.74;$ $\text{TTL}/\text{Img}H < 1.7;$ $0.6 < f1/f < 0.8;$ and $-1.3 < f1/f2 < -0.8,$ wherein HFOV represents half of a field angle of the lens assembly, TTL represents a total track length of the lens assembly, ImgH represents half diameter of an effective pixel region of the lens assembly at an imaging plane, f1 represents a focal length of the first lens, f2 represents a focal length of the second lens, and f represents an effective focal length of the lens assembly.

The lens assembly according to embodiments of the present disclosure meeting the above formulas has characteristics such as broad field angle (wide angle), miniaturization and high imaging quality. In particular, the formula tan(HFOV)>0.74 may ensure the lens assembly a broad field angle, and the formula TTL/ImgH<1.7 benefits to miniaturization of the lens assembly. The first lens E1 provides an adequate refractive power to the lens assembly, so as to guarantee the imaging quality and shorten the total track length of the lens assembly at the same time. The second lens E2 is distributed with appropriated a refractive power in accordance with that of the first lens E1, so as to improve the resolution of the lens assembly.

In some embodiments, the lens assembly further meets the following formulas:

$|(R1+R2)/(R1-R2)| < 0.4;$ and $-1.5 < R2/f < -0.5,$ wherein R1 represents a curvature radius of the object side of the first lens E1, and R2 represents a curvature radius of an image side of the first lens E1.

The first lens E1 is defined in such shape meeting the above formulas, so that the field angle of the lens assembly is enlarged.

In some embodiments, the lens assembly further meets the following formulas:

$$-8<(R5+R6)/(R5-R6)<-4;\text{ and}$$

$$0.8<f3/f<1.6,$$

wherein R5 represents a curvature radius of an object side of the third lens E3, R6 represents a curvature radius of an image side of the third lens E3, and f3 represents a focal length of the third lens E3.

The third lens E3 is defined in such shape and refractive power meeting the above formulas, so as to effectively eliminate distortion of the lens assembly, thereby to improve the imaging quality.

In some embodiments, the lens assembly further meets the following formulas:

$$1.4<CT1/CT2<1.9,\text{ and}$$

$$1.8<CT3/CT2<2.0,$$

wherein CT1 represents a center thickness of the first lens E1, CT2 represents a center thickness of the second lens E2, and CT3 represents a center thickness of the third lens E3.

The first lens E1, the second lens E2 and the third lens E3 are arranged in such manner, so as to miniaturize the lens assembly and guarantee manufacturing and assembling processes going well.

In some embodiments, the lens assembly further meets the formula:

$$0.4<(CT1+CT2+CT3)/\text{TTL}<0.6.$$

The lens assembly is arranged in such manner so as to shorten the total length of the lens assembly, thereby to miniaturize the lens assembly.

In some embodiments, an image side of the first lens E1 is of a convexity. An object side of the second lens E2 is of a concavity, and an image side of the second lens E2 is of a convexity. An object side of the third lens E3 is of a convexity and has one inflection point, and an image side of the third lens E3 is of a concavity and has one inflection point.

In some embodiments, the lens assembly further includes a diaphragm arranged between an object being imaged and the second lens E2.

In some embodiments, each of the first lens E1, the second lens E2 and the third lens E3 is made of a plastic material.

In some embodiments, an image side of the second lens E2 has one inflection point.

A surface shape of the aspheric surface is determined by the following formula:

$$x = \frac{ch^2}{1+\sqrt{1-(k+1)c^2h^2}} + \sum A_i h^i,$$

wherein h represents a height from any point on the aspheric surface to the optical axis, c represents a vertex curvature, k represents a cone constant, Ai is a coefficient for the i-th order of the aspheric surface.

Example 1

Referring to FIG. 1, in the lens assembly of Example 1, a diaphragm is arranged between an object being imaged and the first lens E1. The lens assembly includes a diaphragm having a plane S1, the first lens E1 having the object side S2 and the image side S3, the second lens E2 having the object side S4 and the image side S5, and the third lens E3 having the object side S6 and the image side S7 from the object side of the lens assembly to the image side of the lens assembly in turn. An image is formed on an imaging surface S10 by light irradiating on the object being imaged and passing through the lens assembly via a filter E4. The filter E4 includes the object side S8 and the image side S9.

The lens assembly meets the following parameters:

$$\text{TTL}=2.83; f1=1.39; f2=-1.6; f3=2.79; f=1.98;$$

$$\tan(\text{HFOV})=0.97; \text{TTL/Img}H=1.45;$$

$$(R1+R2)/(R1-R2)=0.24; R2/f=-0.58;$$

$$f1/f=0.7; f1/f2=-0.87;$$

$$(R5+R6)/(R5-R6)=-7.11; f3/f=1.41;$$

$$CT1/CT2=1.74; CT3/CT2=1.83;$$

$$(CT1+CT2+CT3)/\text{TTL}=0.54;$$

A value of the diaphragm is 2.4; and ImgH is 1.94.

The lens assembly according to embodiments of the present disclosure further meets the parameters in the following Tables 1 and 2, respectively.

TABLE 1

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0000 | | 0.0000 |
| S2 | aspheric | 1.8468 | 0.5833 | 1.54/56.1 | 2.1682 |
| S3 | aspheric | −1.1401 | 0.2634 | | −1.5380 |
| S4 | aspheric | −0.5045 | 0.3358 | 1.64/23.3 | −0.9734 |
| S5 | aspheric | −1.2473 | 0.1791 | | −1.3266 |
| S6 | aspheric | 0.7205 | 0.6136 | 1.54/56.1 | −8.3548 |
| S7 | aspheric | 0.9565 | 0.2553 | | −0.6334 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 2

| Surface No. | A4 | A6 | A8 | A10 | A12 | A14 | A16 |
|---|---|---|---|---|---|---|---|
| S2 | −8.3985E−02 | −6.1643E+00 | 4.6446E+01 | −1.8651E+02 | 9.7929E+01 | 6.1106E+02 | 1.4451E+02 |
| S3 | −8.6625E−01 | 1.5335E+00 | −1.1703E+01 | 6.7013E+01 | −2.0112E+02 | 2.6446E+02 | −1.2241E+02 |
| S4 | −9.9983E−01 | 8.0167E+00 | 4.9257E+00 | −7.1310E+01 | 7.1007E+01 | 1.7014E+02 | −2.7399E+02 |
| S5 | −2.6284E+00 | 1.7106E+01 | −6.6986E+00 | 2.1399E+02 | −4.4165E+02 | 4.9658E+02 | −2.3118E+02 |
| S6 | −7.6747E−01 | 1.8597E+00 | −2.4396E+00 | 1.1269E+00 | 6.8554E−01 | −9.2015E−01 | 2.6767E−01 |
| S7 | −9.9280E−01 | 1.3962E+00 | −1.5059E+00 | 1.0189E+00 | −4.3165E−01 | 1.0559E−01 | −1.1759E−02 |

Figure 2:
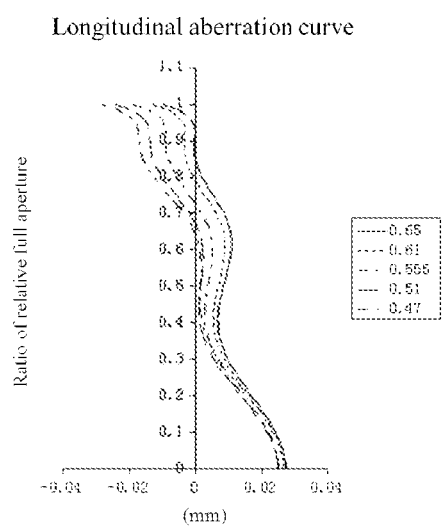
FIG. 2 is a diagram showing a longitudinal aberration curve (mm) of the lens assembly in Example 1.
Figure 3:
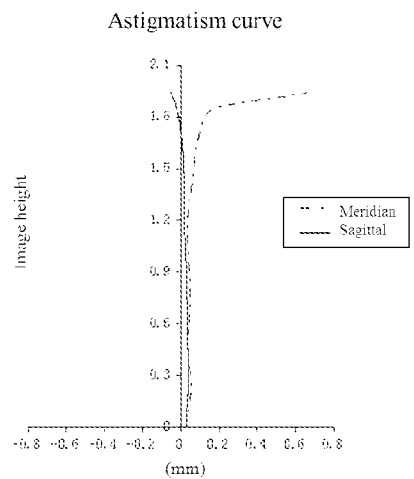
FIG. 3 is a diagram showing an astigmatism curve (mm) of the lens assembly in Example 1.
Figure 4:
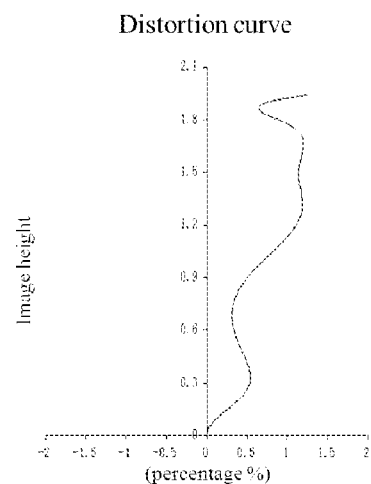
FIG. 4 is a diagram showing a distortion curve (%) of the lens assembly in Example 1.
Figure 5:
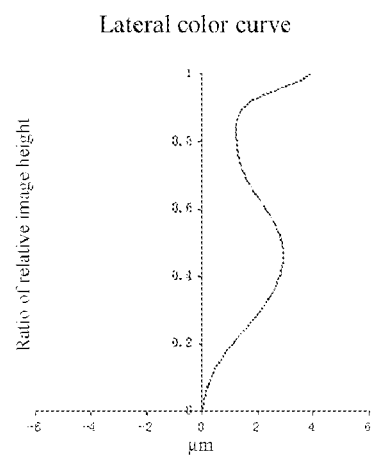
FIG. 5 is a diagram showing a lateral color curve (μm) of the lens assembly in Example 1.

FIG. 2 is a diagram showing a longitudinal aberration curve (mm) of the lens assembly in Example 1; FIG. 3 is a diagram showing an astigmatism curve (mm) of the lens assembly in Example 1; FIG. 4 is a diagram showing a distortion curve (%) of the lens assembly in Example 1; and FIG. 5 is a diagram showing a lateral color curve (μm) of the lens assembly in Example 1. As can be seen from the above data, the aberration of the lens assembly is still controlled within a reasonable range in the case of meeting requirements on the large wide angle and the miniaturization, so as to guarantee the imaging quality.

Example 2

Figure 6:
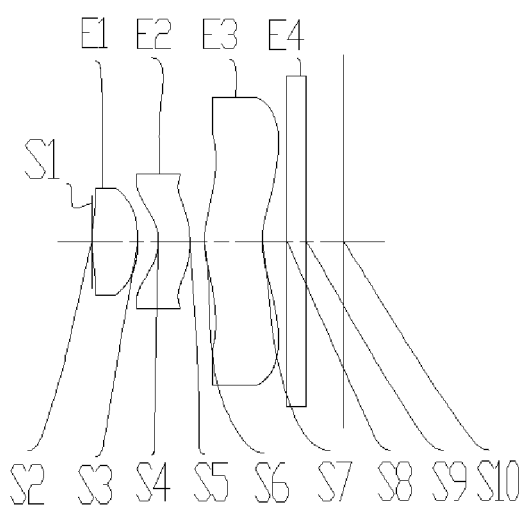
FIG. 6 is a schematic view showing the lens assembly according to Example 2 of the present disclosure.

Referring to FIG. 6, the lens assembly in Example 2 is substantially the same with that in Example 1, but meets the following parameters:

$TTL=2.66; f1=1.37; f2=-1.67; f3=2.65; f=1.83;$ $\tan(HFOV)=1.04; TTL/ImgH=1.37;$ $(R1+R2)/(R1-R2)=0.11; R2/f=-0.69;$ $f1/f=0.74; f1/f2=-0.82;$ $(R5+R6)/(R5-R6)=-6.68; f3/f=1.45;$ $CT1/CT2=1.44; CT3/CT2=1.82;$ $(CT1+CT2+CT3)/TTL=0.54;$ A value of the diaphragm is 2.4; and ImgH is 1.94.

The lens assembly according to embodiments of the present disclosure further meets the parameters in the following Tables 3 and 4, respectively.

Figure 7:
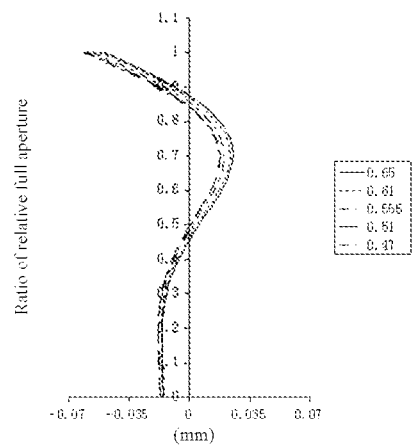
FIG. 7 is a diagram showing a longitudinal aberration curve (mm) of the lens assembly in Example 2.
Figure 8:
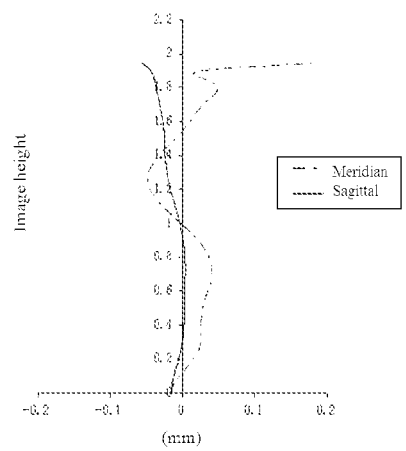
FIG. 8 is a diagram showing an astigmatism curve (mm) of the lens assembly in Example 2.
Figure 9:
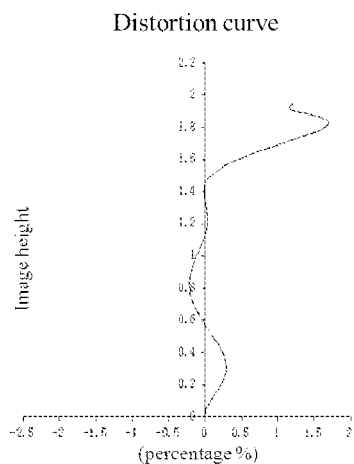
FIG. 9 is a diagram showing a distortion curve (%) of the lens assembly in Example 2.
Figure 10:
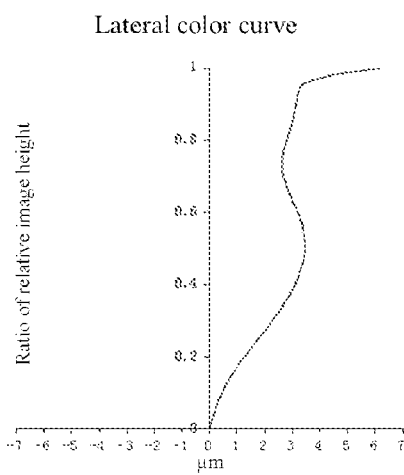
FIG. 10 is a diagram showing a lateral color curve (μm) of the lens assembly in Example 2.

FIG. 7 is a diagram showing a longitudinal aberration curve (mm) of the lens assembly in Example 2; FIG. 8 is a diagram showing an astigmatism curve (mm) of the lens assembly in Example 2; FIG. 9 is a diagram showing a distortion curve (%) of the lens assembly in Example 2; FIG. 10 is a diagram showing a lateral color curve (μm) of the lens assembly in Example 2. As can be seen from the above data, the aberration of the lens assembly is still controlled within a reasonable range in the case of meeting requirements on the large wide angle and the miniaturization, so as to guarantee the imaging quality.

Example 3

Figure 11:
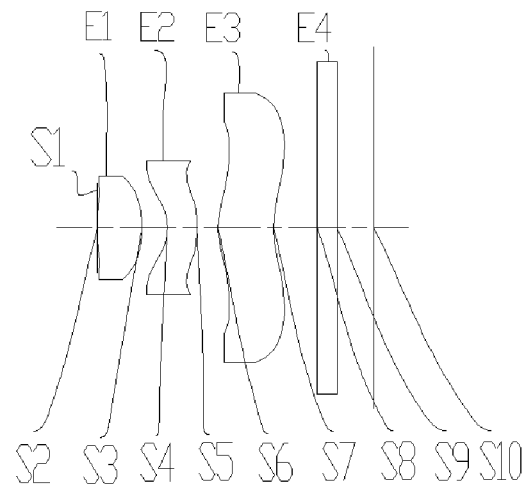
FIG. 11 is a schematic view showing the lens assembly according to Example 3 of the present disclosure.

Referring to FIG. 11, the lens assembly in Example 3 is substantially the same with that in Example 1, but meets the following parameters:

Related parameters of the lens assembly of the present example are as follows:

$TTL=2.94; f1=1.47; f2=-1.52; f3=2.47; f=2.10;$ $\tan(HFOV)=0.89; TTL/ImgH=1.52;$ $(R1+R2)/(R1-R2)=0.17; R2/f=-0.62;$ $f1/f=0.7; f1/f2=-0.96;$ $(R5+R6)/(R5-R6)=-5.04; f3/f=1.17;$ $CT1/CT2=1.51; CT3/CT2=1.87;$ $(CT1+CT2+CT3)/TTL=0.47;$ A value of the diaphragm is 2.4; and ImgH is 1.94.

The lens assembly according to embodiments of the present disclosure further meets the parameters in the following Tables 5 and 6, respectively.

TABLE 3

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0000 | | 0.0000 |
| S2 | aspheric | 1.5721 | 0.4843 | 1.54/56.1 | −0.3648 |
| S3 | aspheric | −1.2666 | 0.2152 | | −0.0500 |
| S4 | aspheric | −0.5425 | 0.3365 | 1.64/23.3 | −0.9499 |
| S5 | aspheric | −1.3583 | 0.1509 | | −1.9411 |
| S6 | aspheric | 0.7054 | 0.6127 | 1.54/56.1 | −8.3436 |
| S7 | aspheric | 0.9538 | 0.2587 | | −0.6407 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 5

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0000 | | 0.0000 |
| S2 | aspheric | 1.8313 | 0.4773 | 1.54/56.1 | −4.0029 |
| S3 | aspheric | −1.2945 | 0.2693 | | −1.2535 |
| S4 | aspheric | −0.5719 | 0.3162 | 1.64/23.3 | −0.9772 |
| S5 | aspheric | −1.6689 | 0.2229 | | −2.5050 |
| S6 | aspheric | 0.7107 | 0.5913 | 1.54/56.1 | −7.0443 |
| S7 | aspheric | 1.0622 | 0.4657 | | −0.6057 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 4

| Surface No. | A4 | A6 | A8 | A10 | A12 | A14 | A16 |
|---|---|---|---|---|---|---|---|
| S2 | −1.5911E−01 | −6.3561E+00 | 4.6124E+01 | −1.8523E+02 | 1.1091E+02 | 5.8852E+02 | −1.0753E+03 |
| S3 | −9.6903E−01 | 1.1620E+00 | −1.2223E+01 | 6.7384E+01 | −1.9874E+02 | 2.6266E+02 | −1.6231E+02 |
| S4 | −1.0206E+00 | 7.9086E+00 | 5.0168E+00 | −7.0281E+01 | 7.3537E+01 | 1.7067E+02 | −3.0234E+02 |
| S5 | −2.5916E+00 | 1.7218E+01 | −6.6811E+01 | 2.1409E+02 | −4.4194E+02 | 4.9554E+02 | −2.3311E+02 |
| S6 | −7.5137E−01 | 1.8615E+00 | −2.4403E+00 | 1.1264E+00 | 6.8527E−01 | −9.2018E−01 | 2.6778E−01 |
| S7 | −9.9080E−01 | 1.3980E+00 | −1.5055E+00 | 1.0191E+00 | −4.3156E−01 | 1.0563E−01 | −1.1746E−02 |

TABLE 6

| Surface No. | A4 | A6 | A8 | A10 | A12 | A14 | A16 |
|---|---|---|---|---|---|---|---|
| S2 | −2.1493E−01 | −6.0588E+00 | 4.7798E+01 | −1.8170E+02 | 9.4292E+01 | 4.7864E+02 | −5.3700E+02 |
| S3 | −8.9133E−01 | 1.1941E+00 | −1.2270E+01 | 6.8051E+01 | −1.9255E+02 | 2.7760E+02 | −2.3637E+02 |
| S4 | −9.9923E−01 | 7.8952E+00 | 4.7657E+00 | −7.0953E+01 | 7.3511E+01 | 1.7485E+02 | −2.9178E+02 |
| S5 | −2.5798E+00 | 1.7105E+01 | −6.7104E+01 | 2.1377E+02 | −4.4168E+02 | 4.9702E+02 | −2.3092E+02 |
| S6 | −8.0630E−01 | 1.8928E+00 | −2.4313E+00 | 1.1235E+00 | 6.8285E−01 | −9.2159E−01 | 2.6654E−01 |
| S7 | −9.7893E−01 | 1.3862E+00 | −1.4993E+00 | 1.0217E+00 | −4.3173E−01 | 1.0531E−01 | −1.1875E−02 |

Figure 12:
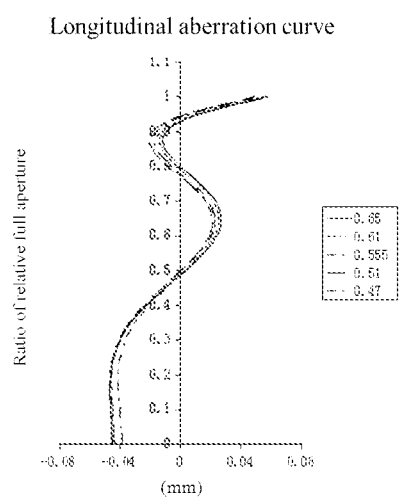
FIG. 12 is a diagram showing a longitudinal aberration curve (mm) of the lens assembly in Example 3.
Figure 13:
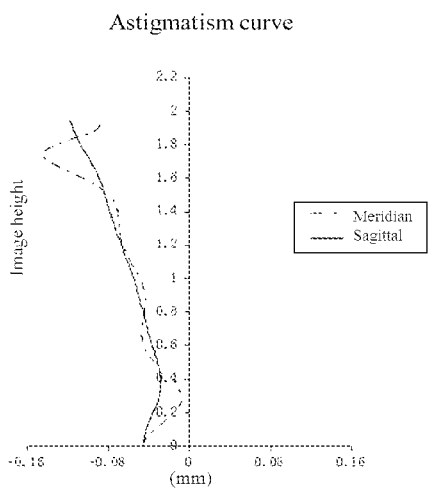
FIG. 13 is a diagram showing an astigmatism curve (mm) of the lens assembly in Example 3.
Figure 14:
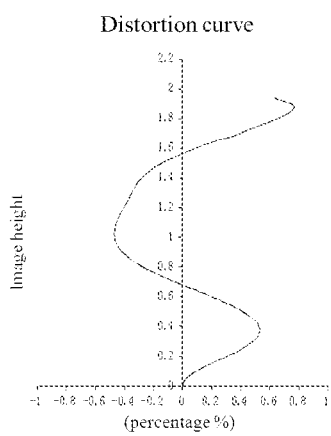
FIG. 14 is a diagram showing a distortion curve (%) of the lens assembly in Example 3.
Figure 15:
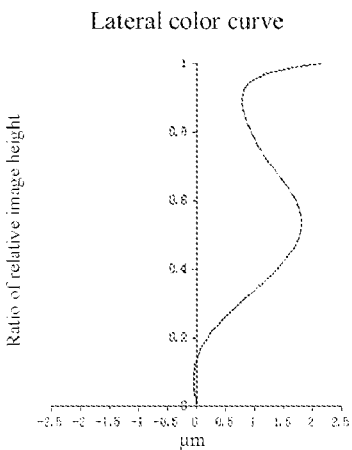
FIG. 15 is a diagram showing a lateral color curve (μm) of the lens assembly in Example 3.

FIG. 12 is a diagram showing a longitudinal aberration curve (mm) of the lens assembly in Example 3; FIG. 13 is a diagram showing an astigmatism curve (mm) of the lens assembly in Example 3; FIG. 14 is a diagram showing a distortion curve (%) of the lens assembly in Example 3; FIG. 15 is a diagram showing a lateral color curve (μm) of the lens assembly in Example 3. As can be seen from the above data, the aberration of the lens assembly is still controlled within a reasonable range in the case of meeting requirements on the large wide angle and the miniaturization, so as to guarantee the imaging quality.

Example 4

Figure 16:
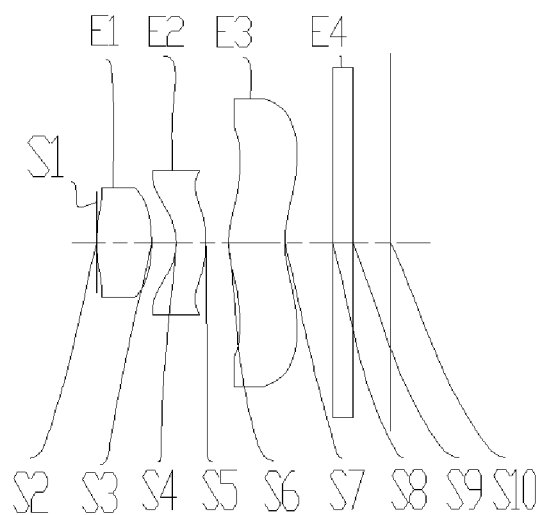
FIG. 16 is a schematic view showing the lens assembly according to Example 4 of the present disclosure.

Referring to FIG. 16, the lens assembly in Example 4 is substantially the same with that in Example 1, but meets the following parameters:

TABLE 7

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0000 | | 0.0000 |
| S2 | aspheric | 1.5239 | 0.5630 | 1.54/56.1 | 0.7163 |
| S3 | aspheric | −1.6302 | 0.2518 | | −1.9339 |
| S4 | aspheric | −0.5955 | 0.3048 | 1.64/23.3 | −0.8795 |
| S5 | aspheric | −1.6945 | 0.2330 | | −3.2177 |
| S6 | aspheric | 0.7276 | 0.5785 | 1.54/56.1 | −6.9883 |
| S7 | aspheric | 1.0296 | 0.4888 | | −0.6304 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 8

| Surface No. | A4 | A6 | A8 | A10 | A12 | A14 | A16 |
|---|---|---|---|---|---|---|---|
| S2 | −1.4103E−01 | −5.7138E+00 | 4.8781E+01 | −1.7988E+02 | 1.0524E+02 | 5.2968E+02 | −6.2609E+02 |
| S3 | −8.4112E−01 | 1.3922E+00 | −1.1814E+01 | 6.7705E+01 | −1.9885E+02 | 2.6608E+02 | −1.3683E+02 |
| S4 | −1.0904E+00 | 7.6689E+00 | 4.5957E+00 | −7.0874E+01 | 7.3495E+01 | 1.7421E+02 | −2.8150E+02 |
| S5 | −2.5696E+00 | 1.7088E+01 | −6.7224E+01 | 2.1366E+02 | −4.4170E+02 | 4.9717E+02 | −2.2999E+02 |
| S6 | −8.0529E−01 | 1.8909E+00 | −2.4314E+00 | 1.1246E+00 | 6.8231E−01 | −9.2194E−01 | 2.6729E−01 |
| S7 | −9.9148E−01 | 1.3969E+00 | −1.5022E+00 | 1.0203E+00 | −4.3146E−01 | 1.0548E−01 | −1.1880E−02 |

Related parameters of the lens assembly of the present example are as follows:

$TTL=3.02; f1=1.54; f2=-1.6; f3=2.71; f=2.23;$ $\tan(HFOV)=0.84; TTL/ImgH=1.56;$ $(R1+R2)/(R1-R2)=0.03; R2/f=-0.73;$ $f1/f=0.69; f1/f2=-0.96;$ $(R5+R6)/(R5-R6)=-5.82; f3/f=1.22;$ $CT1/CT2=1.85; CT3/CT2=1.898;$ $(CT1+CT2+CT3)/TTL=0.48;$ A value of the diaphragm is 2.4; and ImgH is 1.94.

The lens assembly according to embodiments of the present disclosure further meets the parameters in the following Tables 7 and 8, respectively.

Figure 17:
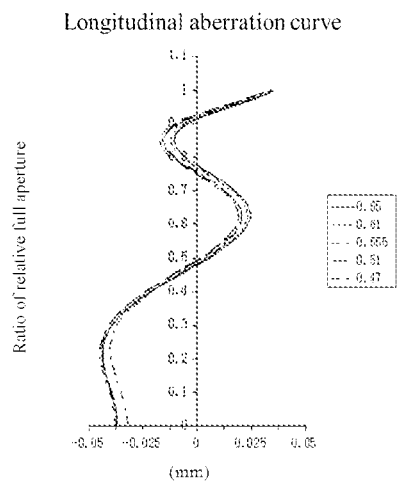
FIG. 17 is a diagram showing a longitudinal aberration curve (mm) of the lens assembly in Example 4.
Figure 18:
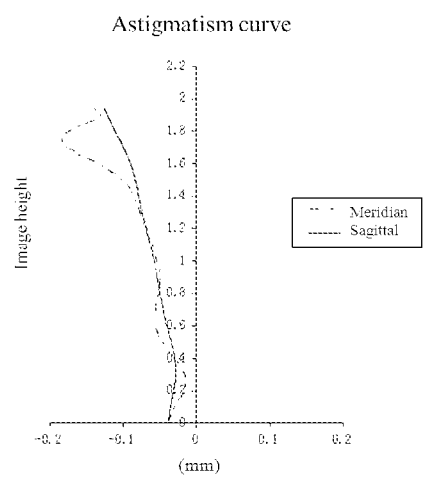
FIG. 18 is a diagram showing an astigmatism curve (mm) of the lens assembly in Example 4.
Figure 19:
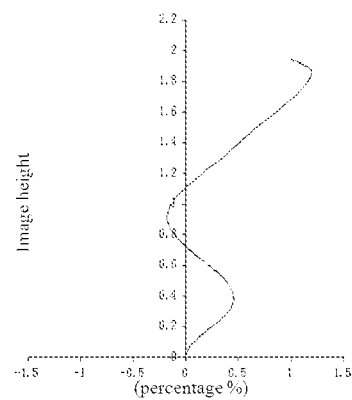
FIG. 19 is a diagram showing a distortion curve (%) of the lens assembly in Example 4.
Figure 20:
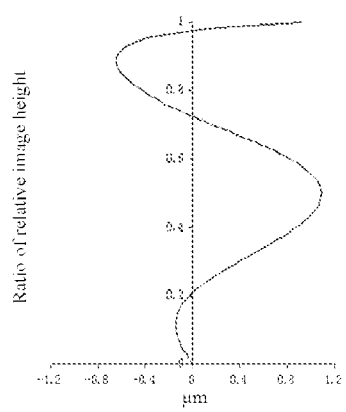
FIG. 20 is a diagram showing a lateral color curve (μm) of the lens assembly in Example 4.

FIG. 17 is a diagram showing a longitudinal aberration curve (mm) of the lens assembly in Example 4; FIG. 18 is a diagram showing an astigmatism curve (mm) of the lens assembly in Example 4; FIG. 19 is a diagram showing a distortion curve (%) of the lens assembly in Example 4; FIG. 20 is a diagram showing a lateral color curve (μm) of the lens assembly in Example 4. As can be seen from the above data, the aberration of the lens assembly is still controlled within a reasonable range in the case of meeting requirements on the large wide angle and the miniaturization, so as to guarantee the imaging quality.

Example 5

Figure 21:
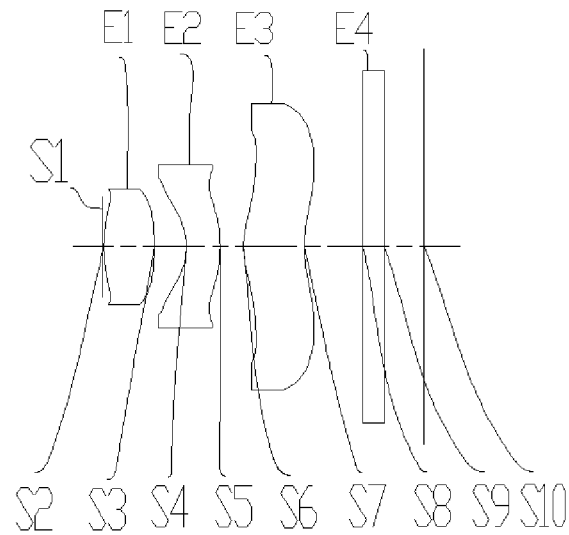
FIG. 21 is a schematic view showing the lens assembly according to Example 5 of the present disclosure.

Referring to FIG. 21, the lens assembly in Example 5 is substantially the same with that in Example 1, but meets the following parameters:

Related parameters of the lens assembly of the present example are as follows:

$TTL=3.14; f1=1.73; f2=-1.59; f3=2.35; f=2.38;$ $\tan(HFOV)=0.8; TTL/ImgH=1.62;$ $(R1+R2)/(R1-R2)=0.25; R2/f=-1.02;$ $f1/f=0.73; f1/f2=-1.09;$ $(R5+R6)/(R5-R6)=-4.56; f3/f=0.99;$ $CT1/CT2=1.51; CT3/CT2=1.805;$ $(CT1+CT2+CT3)/TTL=0.45;$ A value of the diaphragm is 2.4; and ImgH is 1.94.

The lens assembly according to embodiments of the present disclosure further meets the parameters in the following Tables 9 and 10, respectively.

TABLE 9

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0161 | | 0.0000 |
| S2 | aspheric | 1.4397 | 0.4937 | 1.54/56.1 | 1.2183 |
| S3 | aspheric | −2.4152 | 0.3108 | | −4.2111 |
| S4 | aspheric | −0.6665 | 0.3290 | 1.64/23.3 | −0.7921 |
| S5 | aspheric | −2.2838 | 0.2271 | | 1.6839 |
| S6 | aspheric | 0.7052 | 0.5938 | 1.54/56.1 | −6.5896 |
| S7 | aspheric | 1.1019 | 0.5718 | | −0.5851 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 10

| Surface No. | A4 | A6 | A8 | A10 | A12 | A14 | A16 |
|---|---|---|---|---|---|---|---|
| S2 | −5.2610E−02 | −6.0420E+00 | 4.7272E+01 | −1.7529E+02 | 1.4021E+02 | 5.7955E+02 | −1.2043E+03 |
| S3 | −7.6133E−01 | 1.4201E+00 | −1.2742E+01 | 6.4947E+01 | −1.9710E+02 | 2.7961E+02 | −1.5778E+02 |
| S4 | −1.0894E+00 | 6.8596E+00 | 3.2541E+00 | −6.7174E+01 | 8.0021E+01 | 1.6748E+02 | −2.9885E+02 |
| S5 | −2.6529E+00 | 1.6950E+01 | −6.7305E+01 | 2.1373E+02 | −4.4045E+02 | 4.9895E+02 | −2.3505E+02 |
| S6 | −8.5304E−01 | 1.9474E+00 | −2.4173E+00 | 1.1111E+00 | 6.7019E−01 | −9.2491E−01 | 2.7196E−01 |
| S7 | −9.8406E−01 | 1.3718E+00 | −1.4947E+00 | 1.0263E+00 | −4.3093E−01 | 1.0482E−01 | −1.2484E−02 |

Figure 22:
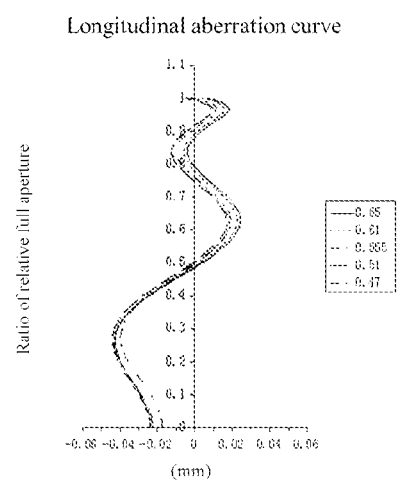
FIG. 22 is a diagram showing a longitudinal aberration curve (mm) of the lens assembly in Example 5.
Figure 23:
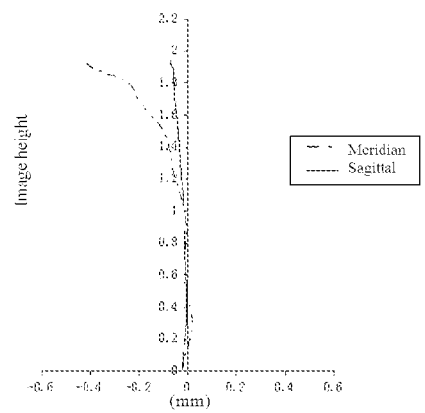
FIG. 23 is a diagram showing an astigmatism curve (mm) of the lens assembly in Example 5.
Figure 24:
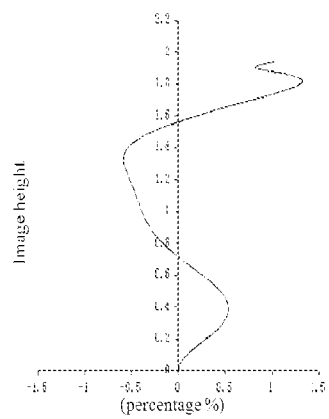
FIG. 24 is a diagram showing a distortion curve (%) of the lens assembly in Example 5.
Figure 25:
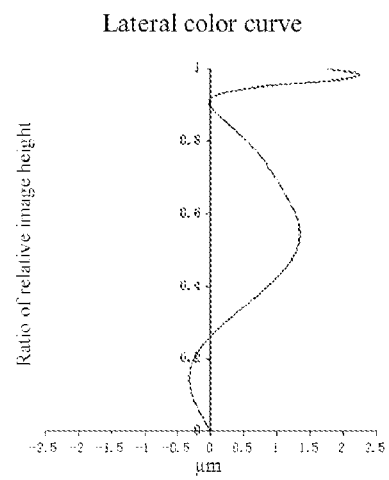
FIG. 25 is a diagram showing a lateral color curve (μm) of the lens assembly in Example 5.

FIG. 22 is a diagram showing a longitudinal aberration curve (mm) of the lens assembly in Example 5; FIG. 23 is a diagram showing an astigmatism curve (mm) of the lens assembly in Example 5; FIG. 24 is a diagram showing a distortion curve (%) of the lens assembly in Example 5; FIG. 25 is a diagram showing a lateral color curve (μm) of the lens assembly in Example 5. As can be seen from the above data, the aberration of the lens assembly is still controlled within a reasonable range in the case of meeting requirements on the large wide angle and the miniaturization, so as to guarantee the imaging quality.

Example 6

Figure 26:
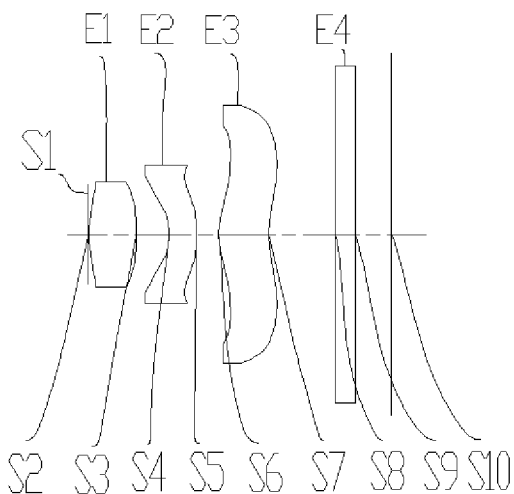
FIG. 26 is a schematic view showing the lens assembly according to Example 6 of the present disclosure.

Referring to FIG. 26, the lens assembly in Example 6 is substantially the same with that in Example 1, but meets the following parameters:

Related parameters of the lens assembly of the present example are as follows:

$TTL=3.26; f1=1.92; f2=-1.61; f3=2.20; f=2.55;$ $\tan(HFOV)=0.75; TTL/ImgH=1.68;$ $(R1+R2)/(R1-R2)=0.39; R2/f=-1.29;$ $f1/f=0.75; f1/f2=-1.2;$ $(R5+R6)/(R5-R6)=-4.02; f3/f=0.86;$ $CT1/CT2=1.73; CT3/CT2=1.82;$ $(CT1+CT2+CT3)/TTL=0.41;$ A value of the diaphragm is 2.4; and ImgH is 1.94.

The lens assembly according to embodiments of the present disclosure further meets the parameters in the following Tables 11 and 12, respectively.

TABLE 11

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | spheric | infinity | 0.0116 | | 0.0000 |
| S2 | aspheric | 1.4547 | 0.5104 | 1.54/56.1 | 1.3217 |
| S3 | aspheric | −3.2873 | 0.3498 | | −3.9676 |
| S4 | aspheric | −0.6615 | 0.2946 | 1.64/23.3 | −0.6465 |
| S5 | aspheric | −2.1582 | 0.2374 | | 2.8781 |
| S6 | aspheric | 0.6798 | 0.5375 | 1.54/56.1 | −5.8977 |
| S7 | aspheric | 1.1297 | 0.7175 | | −0.6791 |
| S8 | spheric | infinity | 0.2100 | 1.52/64.2 | 0.0000 |
| S9 | spheric | infinity | 0.3899 | | 0.0000 |
| S10 | spheric | infinity | | | 0.0000 |

TABLE 12

| Surface No. | A4 | A6 | A8 | A10 | A12 | A14 | A16 |
|---|---|---|---|---|---|---|---|
| S2 | 4.1947E−03 | −5.5405E+00 | 4.5695E+01 | −1.7652E+02 | 1.5610E+02 | 6.2873E+02 | −1.2714E+03 |
| S3 | −7.0469E−01 | 1.8321E+00 | −1.3405E+01 | 6.0978E+01 | −1.9057E+02 | 3.3413E+02 | −2.5101E+02 |
| S4 | −1.1680E+00 | 6.5275E+00 | 4.8280E+00 | −6.1567E+01 | 7.1396E+01 | 1.1589E+02 | −2.0599E+02 |
| S5 | −2.7880E+00 | 1.7107E+01 | −6.7288E+01 | 2.1422E+02 | −4.4087E+02 | 4.9606E+02 | −2.3071E+02 |
| S6 | −8.9289E−01 | 1.9639E+00 | −2.3874E+00 | 1.1007E+00 | 6.5091E−01 | −9.3050E−01 | 2.8144E−01 |
| S7 | −9.9391E−01 | 1.3778E+00 | −1.4841E+00 | 1.0242E+00 | −4.3178E−01 | 1.0442E−01 | −1.2776E−02 |

Figure 27:
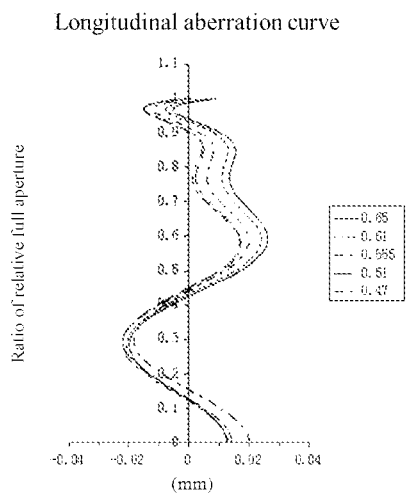
FIG. 27 is a diagram showing a longitudinal aberration curve (mm) of the lens assembly in Example 6.
Figure 28:
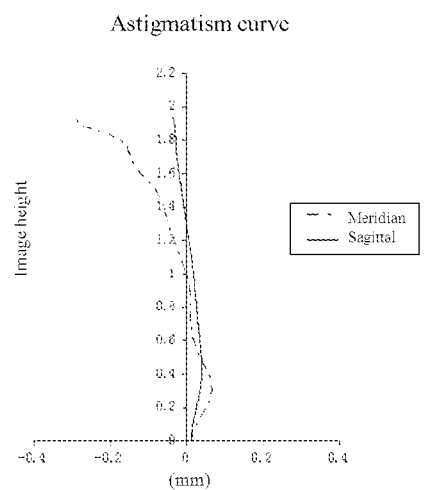
FIG. 28 is a diagram showing an astigmatism curve (mm) of the lens assembly in Example 6.
Figure 29:
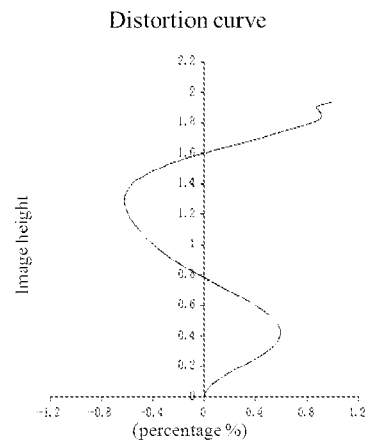
FIG. 29 is a diagram showing a distortion curve (%) of the lens assembly in Example 6.
Figure 30:
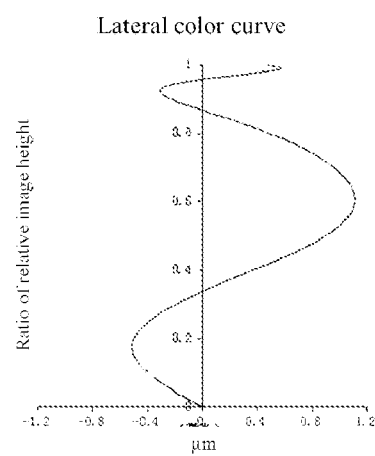
FIG. 30 is a diagram showing a lateral color curve (μm) of the lens assembly in Example 6.

FIG. 27 is a diagram showing a longitudinal aberration curve (mm) of the lens assembly in Example 6; FIG. 28 is a diagram showing an astigmatism curve (mm) of the lens assembly in Example 6; FIG. 29 is a diagram showing a distortion curve (%) of the lens assembly in Example 6; FIG. 30 is a diagram showing a lateral color curve (μm) of the lens assembly in Example 6. As can be seen from the above data, the aberration of the lens assembly is still controlled within a reasonable range in the case of meeting requirements on the large wide angle and the miniaturization, so as to guarantee the imaging quality.

Example 7

Figure 31:
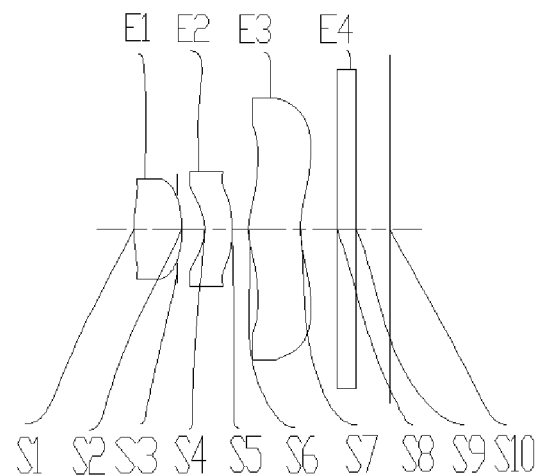
FIG. 31 is a schematic view showing the lens assembly according to Example 7 of the present disclosure.

Referring to FIG. 31, the lens assembly in Example 7 is substantially the same with that in Example 1, but the diaphragm is arranged between the first lens E1 and the second lens E2, therefore the lens assembly includes the first lens E1 having the object side S1 and the image side S2 and the diaphragm having a plane S3 from the object side in turn. The lens assembly meets the following parameters:

Related parameters of the lens assembly of the present example are as follows:

TABLE 13

| Surface No. | Surface Type | Curvature Radius | Thickness | Material (Refractive Index/ Abbe Number) | Cone Coefficient |
|---|---|---|---|---|---|
| Object | spheric | infinity | 500.0000 | | 0.0000 |
| S1 | aspheric | 1.6799 | 0.5416 | 1.54/56.1 | 0.4466 |
| S2 | aspheric | −1.4751 | −0.0462 | | −1.6679 |
| S3 | spheric | infinity | 0.3058 | | 0.0000 |
| S4 | aspheric | −0.5833 | 0.3107 | 1.64/23.3 | −1.4368 |
| S5 | aspheric | −1.5517 | 0.1816 | | −2.6277 |
| S6 | aspheric | 0.7127 | 0.5870 | 1.54/56.1 | −8.1490 |
| S7 | aspheric | 1.0349 | 0.4115 | | −0.6354 |
| S8 | spheric | infinity | 0.2148 | 1.52/64.2 | 0.0000 |
| S9 | spheric | infinity | 0.3804 | | 0.0000 |
| S10 | spheric | infinity | | | 0.0000 |

TABLE 14

| Surface No. | A4 | A6 | A8 | A10 | A12 | A14 | A16 |
|---|---|---|---|---|---|---|---|
| S2 | −1.4576E−01 | −5.7838E+00 | 4.8571E+01 | −1.8035E+02 | 1.0397E+02 | 5.2586E+02 | −6.3264E+02 |
| S3 | −8.4799E−01 | 1.4726E+00 | −1.1155E+01 | 7.0882E+01 | −1.9111E+02 | 2.2611E+02 | −7.3263E+02 |
| S4 | −7.9501E−01 | 2.9668E+00 | 3.0849E+00 | 7.6237E+01 | 1.5550E+02 | −3.3019E+03 | 6.9630E+03 |
| S5 | −2.6033E+00 | 1.7150E+01 | −6.7165E+01 | 2.1398E+02 | −4.3789E+02 | 5.0930E+02 | −2.7039E+02 |
| S6 | −8.0591E−01 | 1.8915E+00 | −2.4307E+00 | 1.1248E+00 | 6.8189E−01 | −9.2197E−01 | 2.6820E−01 |
| S7 | −9.9479E−01 | 1.3983E+00 | −1.5022E+00 | 1.0204E+00 | −4.3143E−01 | 1.0547E−01 | −1.2001E−02 |

TTL=2.89;$f1$=1.53;$f2$=−1.66;$f3$=2.55;$f$=2.07;

tan(HFOV)=0.742;TTL/Img$H$=1.49;

(R1+R2)/(R1−R2)=0.06;R2/$f$=−0.71;

$f1/f$=0.74;$f1/f2$=−0.92;

(R5+R6)/(R5−R6)=−5.42;$f3/f$=1.23;

$CT1/CT2$=1.74;$CT3/CT2$=1.89;

($CT1+CT2+CT3$)/TTL=0.50;

A value of the diaphragm is 2.4; and ImgH is 1.94.

The lens assembly according to embodiments of the present disclosure further meets the parameters in the following Tables 13-14, respectively.

Figure 32:
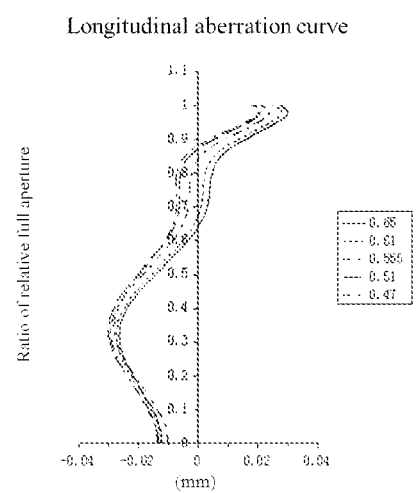
FIG. 32 is a diagram showing a longitudinal aberration curve (mm) of the lens assembly in Example 7.
Figure 33:
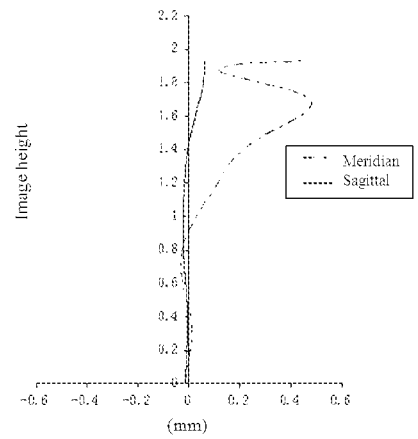
FIG. 33 is a diagram showing an astigmatism curve (mm) of the lens assembly in Example 7.
Figure 34:
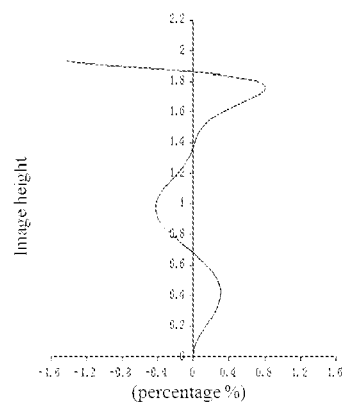
FIG. 34 is a diagram showing a distortion curve (%) of the lens assembly in Example 7.
Figure 35:
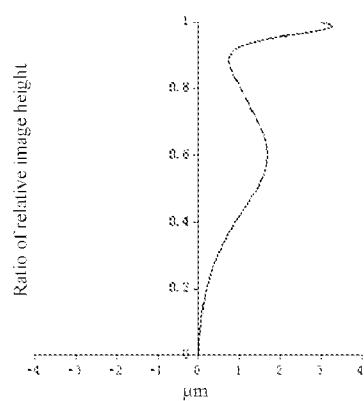
FIG. 35 is a diagram showing a lateral color curve (μm) of the lens assembly in Example 7.

FIG. 32 is a diagram showing a longitudinal aberration curve (mm) of the lens assembly in Example 7; FIG. 33 is a diagram showing an astigmatism curve (mm) of the lens assembly in Example 7; FIG. 34 is a diagram showing a distortion curve (%) of the lens assembly in Example 7; FIG. 35 is a diagram showing a lateral color curve (μm) of the lens assembly in Example 7. As can be seen from the above data, the aberration of the lens assembly is still controlled within a reasonable range in the case of meeting requirements on the large wide angle and the miniaturization, so as to guarantee the imaging quality.

Reference throughout this specification to terms "an embodiment", "some embodiments", "exemplary embodiment", "an example", "a specific example" or "some examples" means that a particular feature, structure, material, or characteristic described in connection with the embodiment or example is included in at least one embodiment or example of the present disclosure. Thus, the exemplary expressions of terms described above are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A lens assembly, comprising:
a first lens, a second lens and a third lens from an object side of the lens assembly to an image side of the lens assembly, in turn, wherein:
the first lens is of a positive refractive power, and an object side of the first lens is of a convexity;
the second lens is of a negative refractive power; and
the third lens is of a positive refractive power, and an image side of the third lens is of a concavity and has one inflection point,
wherein the lens assembly meets the following formulas:

$tan(HFOV)>0.74;$ $TTL/ImgH<1.7;$ $0.6<f1/f<0.8;$ and $-1.3<f1/f2<-0.8,$ wherein HFOV represents a horizontal field of view and equals to half of a field angle of the lens assembly,
TTL represents a total track length of the lens assembly,
ImgH represents half diameter of an effective pixel region of the lens assembly at an imaging plane,
f1 represents a focal length of the first lens,
f2 represents a focal length of the second lens, and
f represents an effective focal length of the lens assembly.

2. The lens assembly according to claim 1, wherein the lens assembly further meets the following formulas:

$|(R1+R2)/(R1-R2)|<0.4;$ and $-1.5<R2/f<-0.5,$ wherein R1 represents a curvature radius of the object side of the first lens, and
R2 represents a curvature radius of an image side of the first lens.

3. The lens assembly according to claim 1, wherein the lens assembly further meets the following formulas:

$-8<(R5+R6)/(R5-R6)<-4;$ and $0.8<f3/f<1.6,$ wherein R5 represents a curvature radius of an object side of the third lens,
R6 represents a curvature radius of the image side of the third lens, and
f3 represents a focal length of the third lens.

4. The lens assembly according to claim 1, wherein the lens assembly further meets the following formulas:

$1.4<CT1/CT2<1.9;$ and $1.8<CT3/CT2<2.0,$ wherein CT1 represents a center thickness of the first lens, CT2 represents a center thickness of the second lens, and CT3 represents a center thickness of the third lens.

5. The lens assembly according to claim 1, wherein the lens assembly further meets the following formula:

$0.4<(CT1+CT2+CT3)/TTL<0.6.$

6. The lens assembly according to claim 1, wherein
an image side of the first lens is of a convexity,
an object side of the second lens is of a concavity,
an image side of the second lens is of a convexity, and
an object side of the third lens is of a convexity and has one inflection point.

7. The lens assembly according to claim 1, further comprising a diaphragm arranged between an object being imaged and the second lens.

8. The lens assembly according to claim 1, wherein each of the first lens, the second lens and the third lens is made of a plastic material.

9. The lens assembly according to claim 1, wherein an image side of the second lens has one inflection point.

* * * * *